United States Patent
Jiang et al.

(10) Patent No.: US 9,106,879 B2
(45) Date of Patent: Aug. 11, 2015

(54) APPARATUS AND METHOD FOR AUTOMATIC WHITE BALANCE WITH SUPPLEMENTARY SENSORS

(75) Inventors: Ming Jiang, Santa Clara, CA (US); Bo Zhang, Milpitas, CA (US); Brett Nottingham, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 13/252,457

(22) Filed: Oct. 4, 2011

(65) Prior Publication Data

US 2013/0083216 A1    Apr. 4, 2013

(51) Int. Cl.
*H04N 9/73* (2006.01)
*G03B 7/08* (2014.01)

(52) U.S. Cl.
CPC . *H04N 9/735* (2013.01); *G03B 7/08* (2013.01)

(58) Field of Classification Search
CPC ... H04N 9/735; G09G 2320/0666; G03B 7/08
USPC ................... 348/223.1, 655, 227.1, 244, 366; 382/167
See application file for complete search history.

(56) References Cited

U.S. PATENT DOCUMENTS

| 2008/0303922 A1* | 12/2008 | Chaudhri et al. | 348/231.99 |
| 2009/0079846 A1* | 3/2009 | Chou | 348/223.1 |
| 2011/0102630 A1* | 5/2011 | Rukes | 348/223.1 |

* cited by examiner

*Primary Examiner* — Mekonnen Dagnew
(74) *Attorney, Agent, or Firm* — Jefferson IP Law, LLP

(57) ABSTRACT

An apparatus and method for An image capture device for Automatic White Balance (AWB) are provided. The device includes a camera for capturing an image, a primary sensor for sensing environmental conditions of the image capture device and for generating data regarding the environmental conditions, a plurality of supplementary sensors for sensing the environmental conditions of the image capture device and for generating supplementary data regarding the environmental conditions, an AWB unit for performing an AWB operation on the captured image according to the generated data and the generated supplementary data, and a controller for controlling the camera, the primary sensor, the plurality of supplementary sensors and the AWB unit.

26 Claims, 3 Drawing Sheets

APPARATUS AND METHOD FOR AUTOMATIC WHITE BALANCE WITH SUPPLEMENTARY SENSORS

BACKGROUND OF THE INVENTION

1. Field of the Invention

The present invention relates to an apparatus and method for Automatic White Balance (AWB) with supplementary sensors. More particularly, the present invention relates to an apparatus and method for providing the AWB using supplementary sensors, or more than one sensor.

2. Description of the Related Art

The use of image capture devices, which may include still image cameras, moving image cameras or other electronic devices that include cameras, has rapidly increased in recent years along with advancements in camera technology. For example, digital cameras are now commonly included in mobile communication terminals, such as cell phones, smart phones, portable computers, tablet computers, and other similar electronic devices. Additionally, advancements in camera technology have provided a proliferation of less expensive and higher quality cameras available to consumers and camera users. For example, an amount of pixels per photographic still image has increased, and other advancements have been made to improve an image quality of the photographs captured by cameras.

Digital cameras allow for a group of settings to be selected or adjusted by a user selecting a scene type description or an image capture mode, such as outdoors, indoors, sunny, close-up, candlelight, nighttime, and other similar scene type descriptions. Among the group of settings, Automatic White Balance (AWB) is used to determine and/or adjust color temperatures and to determine a temperature of neutral colors, such as a color white. By determining and adjusting the color temperature of white, color temperatures of the remaining colors are also adjusted in order to adjust a color composition of a captured image.

In order to perform an AWB, a variety of algorithms and methods may be used by cameras, such as illumination estimation, a Bayesian method, Retinex models, Von Kries' method, a grey world assumption method or other similar algorithms and methods. An AWB operation estimates or determines color temperatures according to assumptions and data or statistics corresponding to sensor data. For example, the gray world assumption method assumes that the color in each sensor channel averages to gray over the entire image, and adjusts the color of white according to the assumption.

Cameras, as noted above, may have a variety of capture modes. When the user chooses a camera mode that is appropriate for the environmental conditions in which an image is to be captured, cameras produce a higher quality image resulting in better pictures because of additional information provided the capture mode selected by the user. The capture modes noted above may include capture modes that provide a scene or environmental condition information for the AWB operation. The scene or environmental condition information may be included in such capture modes sunny, cloudy, incandescent, and fluorescent, or other similar capture modes describing lighting or environmental conditions.

The capture modes are used to narrow a range of the possible color temperatures of light sources in the image to be captured. However, when a camera is set to an AUTO mode that precludes a user from selecting a capture mode, the camera may have to determine the scene or environmental condition information according to the statistics of the captured images by using an AWB algorithm or method.

Some AWB algorithms try to collect better statistics by collecting statistics only from pre-determined or effective regions, that is, the areas that might better satisfy the assumptions upon which the AWB algorithms operate. However, for certain images to be captured, using statistics only from the effective regions does not create photographs having proper colors. In other words, AWB behaves relatively well in most cases but fails to produce color correct images in certain situations, such as when a large bulk of water or a uniform surface is present in the image to be captured. Accordingly, there is a need for an apparatus and method for providing improved AWB.

SUMMARY OF THE INVENTION

Aspects of the present invention are to address at least the above-mentioned problems and/or disadvantages and to provide at least the advantages described below. Accordingly, an aspect of the present invention is to provide an apparatus and method for Automatic White Balance (AWB) with supplementary sensors.

In accordance with an aspect of the present invention, an image capture device for Automatic White Balance (AWB) is provided. The device includes a camera for capturing an image, a primary sensor for sensing environmental conditions of the image capture device and for generating data regarding the environmental conditions, a plurality of supplementary sensors for sensing the environmental conditions of the image capture device and for generating supplementary data regarding the environmental conditions, an AWB unit for performing an AWB operation on the captured image according to the generated data and the generated supplementary data, and a controller for controlling the camera, the primary sensor, the plurality of supplementary sensors and the AWB unit.

In accordance with another aspect of the present invention, a device for An image capture device for AWB is provided. The device includes a camera for capturing an image, a plurality of image sensors for sensing environmental conditions of the image capture device and for generating supplementary data regarding the environmental conditions, an AWB unit for performing an AWB operation on the captured image according to the generated supplementary data, and a controller for controlling the operation of the camera, the plurality of image sensors and the AWB unit.

In accordance with another aspect of the present invention, a method for an AWB operation using supplementary sensors of an image capture device is provided. The method includes capturing image data, sensing environmental conditions by at least one of a camera, a primary sensor and supplementary sensors, generating primary data according to the environmental conditions sensed by at least one of the camera and the primary sensor and generating supplementary data according to the environmental conditions sensed by the supplementary sensors, selecting a capture mode according to the generated primary data and the generated secondary data, and performing the AWB operation on the captured image data according to the selected capture mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for Automatic White Balance (AWB) with supplementary sensors. In other words, exemplary embodiments of the present invention include a camera or an image capturing device that includes more than one sensor providing data for the AWB operation.

Figure 1:
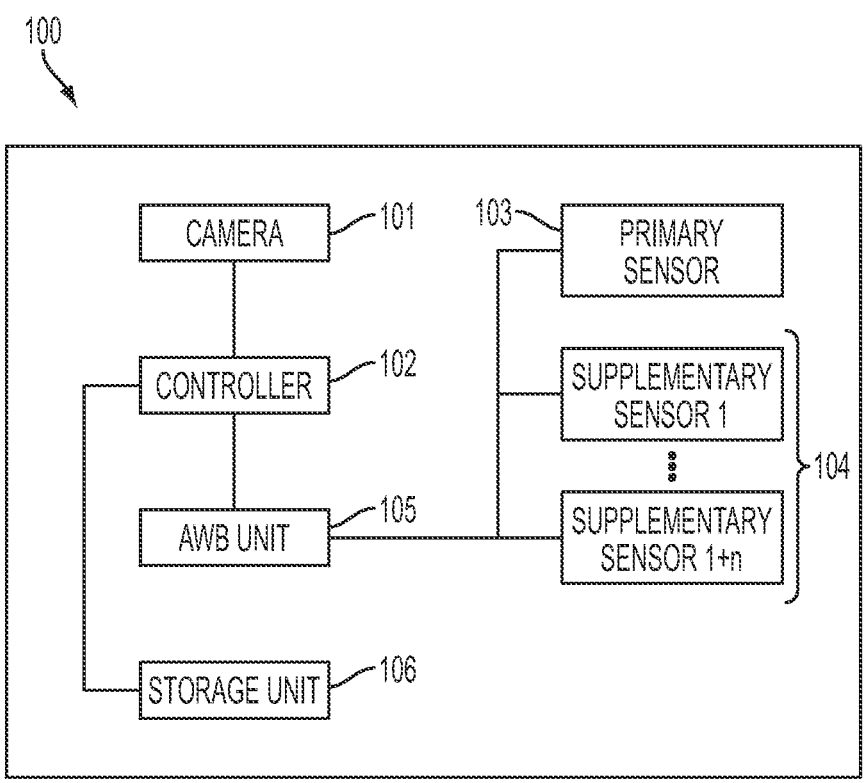
FIG. 1 is an image capture device including supplementary sensors according to an exemplary embodiment of the present invention.

FIG. 1 is an image capture device including supplementary sensors according to an exemplary embodiment of the present invention.

Referring to FIG. 1, an image capture device 100 includes a main camera 101, a controller 102, a primary sensor 103, a plurality of supplementary sensors 104, an AWB unit 105 and a storage device 106. The image capture device 100 may be used to capture still images, such as photographs, and moving images, such as movies or video images. The camera 101 may include a camera lens for optically capturing an image, a Charge Coupled Device (CCD), and other elements used to capture an image on film, as digital data, or to capture the image using other suitable methods. Further detailed description of the camera 101 will not be included herein for the purpose of brevity.

The controller 102 controls the image capture device 100 in order to capture the image. The controller 102 provides electrical signals to control the camera 101, the AWB unit 105, the storage unit 106 and other elements of the image capture device 100. The controller 102 may also receive input signals generated by a user providing input to an input device (not shown) of the image capture device and may provide the user with an image capture device menu displayed on a display unit (not shown) and/or an image that has been or is to be captured by the image capture device 100. For example, the controller 102 may control the display unit to display a user menu allowing for the user to select whether an AWB operation is to be performed or a manual white balance is to be executed by the user of the image capture device 100.

The storage unit 106 stores information and data used by the controller 102 to operate the image capture device 100 and may also be used to store images captured by the image capture device 100. Alternatively, the image capture device 100 may include a removable memory (not shown), such as a Secure Digital (SD) card, or other similar removable memory devices, to store the captured images.

The primary sensor 103 and the supplementary sensors 104 collect data on environmental conditions in which the image is to be captured. For example, the sensors 103, 104 collect statistical data that is used by the AWB unit 105 to perform the AWB operation selected by the user. The statistical data may include Global Positioning System (GPS) information on a location of the image capture device 100, data on an amount of incident or ambient light surrounding the subject of the image to be captured, orientation of the image capture device 100 and other similar information pertinent to the AWB operation. The statistical data or other suitable and/or similar data collected by the primary and supplementary sensors 103 and 104 is provided to the AWB unit 105.

The AWB unit 105 performs the AWB operation using the statistical data or other data collected by the primary sensor 103 and the supplementary sensors 104. For example, the primary sensor 103 collects statistical data with respect to an amount of ambient light present in the image to be captured. However, the statistical data may be unreliable due to environmental conditions, such as there being a large flat surface or a large body of water in the image to be captured. Accordingly, the AWB unit 105 may produce an inaccurate AWB operation result that produces a degraded image quality.

In such a circumstance, the supplementary sensors 104, which are pointed in different directions than the primary sensor 103, may provide additional data on the amount of ambient light present in the image to be captured, thus, increasing an amount and reliability of the statistical data provided to the AWB unit 105. Accordingly, the AWB unit 105 may produce a more accurate AWB operation result that produces an improved image quality in comparison to the degraded picture quality resulting from the inaccurate AWB operation result.

Each of the supplementary sensors 104 may be any one of a variety of sensors, including a light sensor, a gyroscope, a magnetic field sensor, a GPS signal sensor, an orientation sensor, a Radio Frequency (RF) signal sensor, a Wireless Fidelity (WiFi) signal sensor, or other suitable sensors providing data used by the AWB unit 105 to perform the AWB operation. For example, the AWB unit 105 may perform the AWB operation using an estimation of where the image capture device 100 is located. In order to determine a location of the image capture device 100, the GPS signal sensor and the RF signal sensor may be used to sense GPS coordinates of the physical location of the image capture device 100 and whether the image capture device 100 is located inside a building or other constructed structure.

A strength of a received GPS signal and/or RF signal may be used to determine whether the image capture device 100 is located indoors or outdoors. In other words, when the device is located at an open space, such as on a street or in any other similar uncovered space, the AWB unit 105 operates under the assumption that the image to be captured is an outdoor image. Additionally, the received GPS signal and/or RF signal may be used to determine the physical location of the image capture device 100 according to offline or online map databases. For example, when the location of the image capture device 100 is determined to be inside a building or any other construction that the device can be put within, a GPS signal strength and an RF signal strength are used to determine that the image to be captured is an indoor scene.

The orientation sensors may be used to determine a direction the camera 101 is pointing and a tilt angle of the image capture device 100. Accordingly, the AWB unit 105 may determine a compass direction in which the camera 101 is facing and may determine whether the image to be captured includes a large amount of the ground or the sky. In other words, the AWB unit 105 may determine if the camera 101 is facing east in an upwards direction toward the sky or facing west in a downwards direction toward the ground. Accordingly, the orientation of the camera 101, the tilt of the image capture device 100 and whether the image capture device 100 is located indoors or outdoors, may be determined. The AWB unit 105 uses the determinations to select a capture mode in order to execute the AWB operation.

In addition to the data collected by the primary sensor 103 and the supplementary sensors 104, other information and data may be used by the AWB unit 105 to perform the AWB operation. For example, weather information corresponding to the location of the image capture device 100 can be obtained either from offline or online databases. The weather information may indicate an amount of sunshine in the outdoors area of the location of the image capture device 100 or indicate an amount of cloud cover in the sky or whether it is precipitating at the location of the image capture device 100. However, the present invention is not limited thereto, and a variety of other information types, such as a time of day, or other suitable and similar information types, may be used by the AWB unit 105 to determine the capture mode.

Combining the weather, orientation and tilt information, with other information, such as a local time at which the image is to be captured and the image exposure level, it may be determined if a back-lit image is to be captured. For example, at 3 P.M. at a location determined to be an outdoor part, an image is to be captured by the camera 101 pointing west, while the image capture device 100 is at a 45 degree tilt in an upwards direction on a sunny day. In such a case, it is likely that the sun is located behind a subject of the image to be captured, and thus, the probability of back-lit image is high if the image exposure level is also large. Accordingly, the AWB unit 105 selects a capture mode corresponding to the information regarding the environmental conditions sensed by the primary sensor 103 and the supplementary sensors 104 as well as the other information including the weather and time of day.

Figure 2:
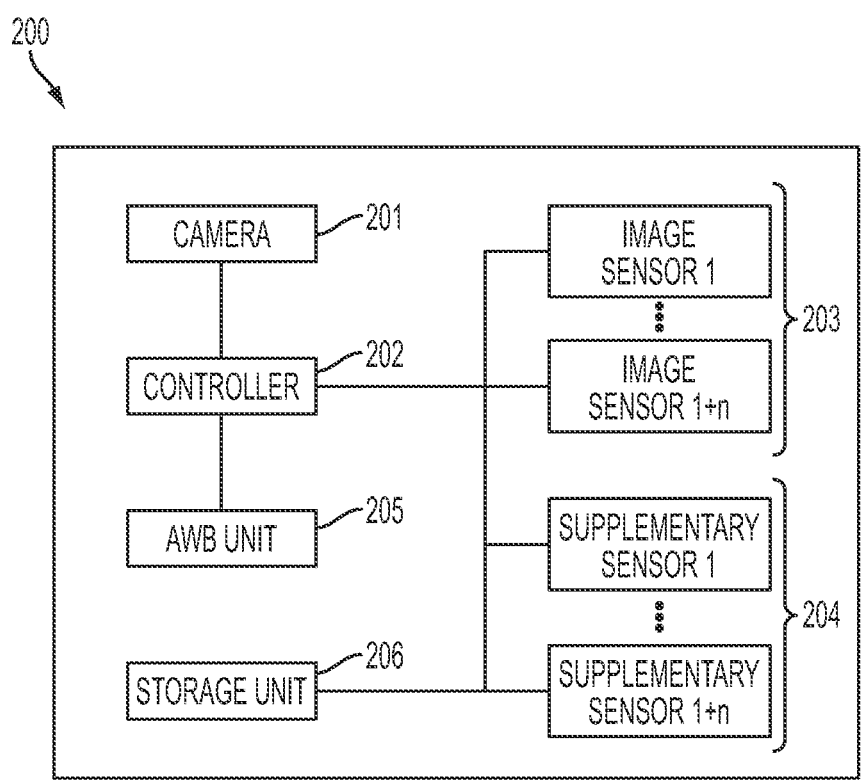
FIG. 2 is an image capture device including image sensors and supplementary sensors according to an exemplary embodiment of the present invention.

FIG. 2 is an image capture device including image sensors and supplementary sensors according to an exemplary embodiment of the present invention.

Referring to FIG. 2, the image capture device 200 includes a camera 201, a controller 202, image sensors 203, supplementary sensors 204, an AWB unit 205 and a storage unit 206. The camera 201, the controller 202, supplementary sensors 204, the AWB unit 205 and the storage unit 206 of the image capture device 200 are similar to corresponding elements described with respect to FIG. 1. Therefore, detailed description of those elements will not be included herein with respect to FIG. 2.

The image sensors 203 may be used as supplementary sensors. In a case where the camera 201 is oriented towards a scene of an image to be captured that produces poor AWB information gathered by the camera 201, the image sensors may be used to acquire additional information or data in order to improve a reliability of the AWB information gathered by the camera 201. For example, when the camera 201 is directed towards a uniform surface, a large body of water, a flower, or other similar items, poor AWB information may be gathered by the camera 201 because the characteristics of the image to be captured with consideration to the environmental conditions in which the image is to be captured. The image sensors 203 may be additional cameras similar to the camera 201, or other types of image sensors such as Infrared (IR) sensors or other similar or suitable image or light sensors. The image sensors 204 point in directions different than a direction in which the camera 201 is pointed.

The image sensors 203 collect data corresponding to scenes other than the scene of the image to be capture by the camera 201. The data corresponding to the other scenes at which the image sensors 203 are pointed are provided to the AWB unit 205. The data provided by the image sensors 203 to the AWB unit 205 may supplement and improve the data provided to the AWB unit 205 by the camera 201. For example, in a case where the camera 201 of the image capture device 200 faces an image to be captured, at least one of the image sensors 203 may be facing in an opposite direction that face a user of the image capture device 200.

In other words, the image capture device 200 may have the camera 201 disposed on a front side of the image capture device 200 facing in a front direction and at least one image sensor disposed on a back side of the image capture device 200 facing in a direction opposite to the front direction. The at least one of the image sensors 203 facing the user of the image capture device 200 may provide useful data to the AWB unit 205 because human faces have distinguishable color tones. Accordingly, the data provided from the image sensors 203 to the AWB unit 205 a color temperatures of the scenes pointed at by the image sensors 203 may be used to determine a color temperatures of the scene of the image to be captured by the camera 201. The AWB unit 205 uses the data provided from the image sensors 203 to determine the capture mode of the image to be captured by the camera 201.

In a case where the image sensors 203 are light sensors, the light sensors provide data that may be used by the AWB unit 205 to determine how the information or data from the supplementary sensors 204 are used. For example, if the image sensors 203 that are light sensors detect unbalanced lighting conditions, the AWB unit 205 may determine that the AWB operation is to depend more on the data from the camera 201 rather than the data from the supplementary sensors 204. Accordingly, the AWB unit 205 may lower a weight of the data provided from supplementary sensors 204 when performing the AWB operation.

Figure 3:
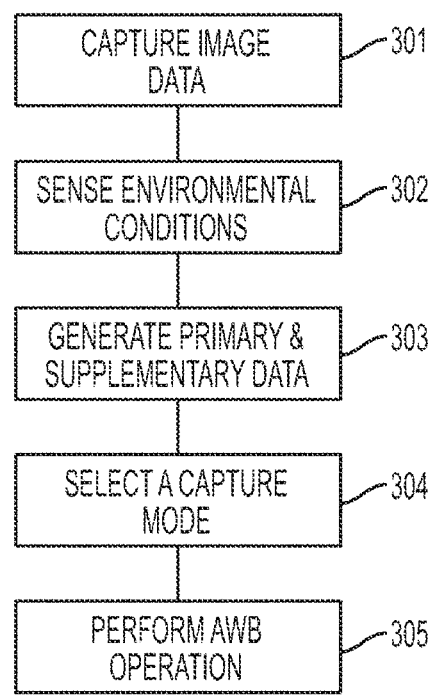
FIG. 3 is a flowchart illustrating an AWB operation according to an exemplary embodiment of the present invention.

FIG. 3 is a flowchart illustrating an AWB operation according to an exemplary embodiment of the present invention.

Referring to FIG. 3, image data is captured by a camera 201 in step 301. In step 302, the camera 201 and at least one of the image sensors 203 and the supplementary sensors 204 sense environmental conditions of a scene in which the captured image was captured. In step 303, at least one of the camera 201 and the image sensors 203 generate primary data according the environmental conditions sensed by the camera 201 and the primary sensor 203 and the supplementary sensors 204 generate supplementary data according to the environmental conditions sensed by the supplementary sensors 204.

Next, in step 304, the AWB unit 205 selects an AWB capture mode according to the primary data and the supplementary data generated by the camera 201, the primary sensor 203, and the supplementary sensors 204. The AWB capture mode may be at least one of an outdoors mode, an indoors mode, a sunny mode, a close-up mode, a candlelight mode, and a nighttime mode. The AWB unit 205 performs the AWB operation on the captured image data according to the selected capture mode in step 305. Additionally, with reference to FIG. 1 and the camera 101, in the exemplary embodiment described in steps 301 to 305, the primary sensor 103 may be used rather than or in addition to the image sensors 203.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image capture device for Automatic White Balance (AWB), the device comprising:
    a camera configured to capture an image;
    a primary sensor configured to sense environmental conditions of the image capture device and to generate data regarding the environmental conditions;
    a plurality of supplementary sensors configured to sense the environmental conditions of the image capture device and to generate supplementary data regarding the environmental conditions;
    an AWB unit configured to perform an AWB operation on the captured image according to the generated data from the primary sensor and the generated supplementary data from the plurality of supplementary sensors; and
    a controller configured to control the camera, the primary sensor, the plurality of supplementary sensors and the AWB unit,
    wherein the plurality of supplementary sensors include a first image sensor and a second image sensor such that the first and second image sensors are positioned in different directions from each other, and
    wherein the supplementary data generated by the first and second image sensors includes color temperature information.

2. The device of claim 1, wherein the first and second image sensors are positioned in different directions from a direction in which the primary sensor faces.

3. The device of claim 1, wherein the first and second image sensors are positioned in different direction from a direction in which the camera faces.

4. The device of claim 1, wherein the AWB unit is further configured to select a capture mode according to the data and the supplementary data from the supplementary sensors.

5. The device of claim 4, wherein the AWB unit is further configured to select an algorithm for the AWB operation according to the selected capture mode.

6. The device of claim 5, wherein the capture mode is at least one of an outdoors mode, an indoors mode, a sunny mode, a close-up mode, a candlelight mode, and a nighttime mode.

7. The device of claim 1, wherein the primary sensor is a light sensor.

8. The device of claim 1, wherein the plurality of supplementary sensors further comprises at least one of a light sensor, a gyroscope, a magnetic field sensor, a Global Positioning System (GPS) signal sensor, an orientation sensor, a Radio Frequency (RF) signal sensor, and a Wireless Fidelity (WiFi) signal sensor.

9. The device of claim 1, wherein the camera is at least one of a still picture camera for capturing a still image and a video camera for capturing moving images.

10. The device of claim 1, wherein the AWB unit assigns a weight to the supplementary data according to an amount of light sensed by the first and second image sensors.

11. The device of claim 10, wherein the assigned weight determines a significance of the supplementary data in the performing of the AWB operation.

12. An image capture device for Automatic White Balance (AWB), the device comprising:
    a camera configured to capture an image;
    a plurality of image sensors configured to sense environmental conditions of the image capture device and to generate supplementary data regarding the environmental conditions;
    an AWB unit configured to perform an AWB operation on the captured image according to the generated supplementary data from the plurality of image sensors; and
    a controller configured to control the operation of the camera, the plurality of image sensors and the AWB unit,
    wherein the plurality of image sensors include a first image sensor and a second image sensor such that the first and second image sensors are positioned in different directions from each other, and
    wherein the supplementary data generated by the first and second image sensors includes color temperature information.

13. The device of claim 12, wherein the first and second image sensors face in different directions from a direction in which the camera faces.

14. The device of claim 12, wherein the AWB unit is further configured to select a capture mode according the supplementary data from the plurality of image sensors.

15. The device of claim 14, wherein the AWB unit is further configured to select an algorithm for the AWB operation according to the selected capture mode.

16. The device of claim 15, wherein the capture mode is at least one of an outdoors mode, an indoors mode, a sunny mode, a close-up mode, a candlelight mode, and a nighttime mode.

17. The device of claim 12, wherein the first and second image sensors comprise at least one of a camera, a light sensor and an infrared sensor.

18. The device of claim 12, wherein the AWB unit is further configured to assign a weight to the supplementary data according to an amount of light sensed by the image sensors.

19. The device of claim 18, wherein the assigned weight determines a significance of the supplementary data in the performing of the AWB operation.

20. The device of claim 12, wherein the camera is at least one of a still picture camera for capturing a still image and a video camera for capturing moving images.

21. A method for Automatic White Balance (AWB) operation using supplementary sensors of an image capture device, the method comprising:
    capturing image data;
    sensing environmental conditions by at least one of a camera, a primary sensor and supplementary sensors;

generating primary data according to the environmental conditions sensed by at least one of the camera and the primary sensor;

generating supplementary data according to the environmental conditions sensed by the supplementary sensors;

selecting a capture mode according to the generated primary data and the generated secondary data; and performing the AWB operation on the captured image data according to the selected capture mode, wherein the plurality of supplementary sensors include a first image sensor and a second image sensor such that the first and second image sensors are positioned in different directions from each other, and wherein generating supplementary data includes generating color temperature information based on data from the first and second image sensors.

22. The method of claim 21, wherein sensing of the environmental conditions comprises sensing at least one of an orientation of the image capture device, a tilt of the image capture device, a location of the image capture device, whether the image capture device is indoors or outdoors, a time of day of the capturing of the image data, an amount of light the image capture device is exposed to, and weather conditions of a location at which the capturing of the image data occurs.

23. The method of claim 21, wherein the capture mode is at least one of an outdoors mode, an indoors mode, a sunny mode, a close-up mode, a candlelight mode, and a nighttime mode.

24. The method of claim 21, wherein the performing of the AWB operation comprises selecting an algorithm for the AWB operation according to the selected capture mode.

25. The method of claim 21, wherein the performing of the AWB operation comprises assigning a weight to the supplementary data according to an amount of light sensed by supplementary sensors.

26. The method of claim 25, wherein the assigned weight determines a significance of the supplementary data in the performing of the AWB operation.

* * * * *